Dec. 26, 1939.  R. M. ROWELL  2,185,038
RECORDING INSTRUMENT
Filed July 12, 1938
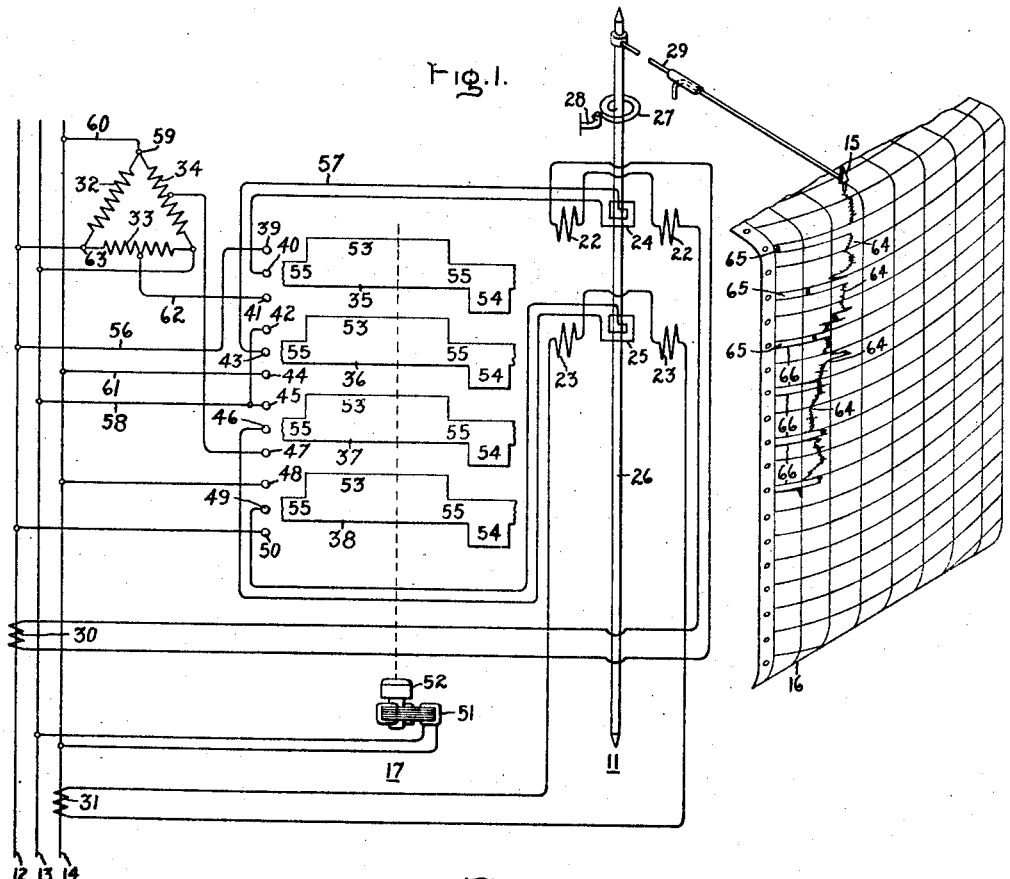
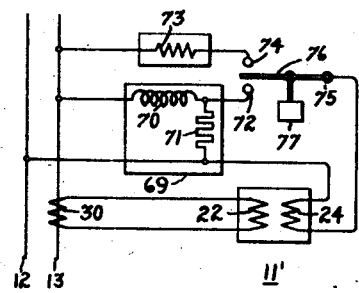
Inventor:
Ralph M. Rowell,
by Harry E. Dunham
His Attorney.

Patented Dec. 26, 1939

2,185,038

UNITED STATES PATENT OFFICE 2,185,038

RECORDING INSTRUMENT

Ralph M. Rowell, Lynn, Mass., assignor to General Electric Company, a corporation of New York Application July 12, 1938, Serial No. 218,781

1 Claim. (Cl. 234—5.5)

This application is a continuation in part of my copending application S. N. 729,838 filed June 9, 1934, now Patent Number 2,134,581, and assigned to the same assignee as the present application.

My invention relates to measuring instruments and concerns particularly methods and devices for indicating or recording a plurality of different quantities.

One of the objects of my invention is to provide an arrangement for obtaining with a single instrument mechanism records of more than one quantity on a record chart.

A further object is to obtain a substantially continuous record of variations of power in an alternating current circuit together with a record from which power factor may be deduced.

Another object is to provide a device for obtaining records of both real and reactive power.

Other and further objects will become apparent as the description proceeds.

In United States Patent 1,904,029 to Knopp there is shown a recording three-phase wattmeter operating by the two-wattmeter method. One of the wattmeter units is periodically disconnected to cause the device to record an indication having no independent significance. From this indication in conjunction with the value of power, the value of the reactive component of power may be calculated. It is an object of my invention to provide an instrument giving records of two different quantities having independent significance.

In carrying out my invention in its preferred form, I provide a strip-chart recorder with a dynamometer type instrument mechanism and a device for periodically changing the connections so that the instrument mechanism deflects in response alternately to watts and to some other quantity of an alternating current circuit dependent upon the phase relationship between potential and current. In one embodiment of the invention, an ordinary wattmeter mechanism is employed and the coils are periodically reconnected to cause the deflection to represent reactive power.

The features of my invention which I believe to be novel and patentable will be pointed out in the claim appended hereto. A better understanding of my invention, itself, however, may be obtained by referring to the following description taken in connection with the accompanying drawing in which Figs. 1 and 2 are schematic circuit diagrams of two embodiments of my invention. The apparatus in Fig. 1 is shown connected to a three-phase alternating current system for recording the power and the power factor conditions therein but it will be understood that my invention is not limited to polyphase circuits nor to measurements of these precise quantities. Referring now more in detail to the drawing in which like reference characters are used to designate like parts throughout, the apparatus consists of an instrument mechanism 11 connected to conductors 12, 13 and 14 of an electrical system and carrying a graph-drawing implement such as a movable pen or other suitable marking point 15, a record strip 16 cooperating with pen 15 to produce the desired records of quantities in the electrical system, and a rotating drum switch 17 changing the connections of the instrument mechanism 11 back and forth at a uniform rate of speed.

The record strip 16 may be mounted and caused to travel at a uniform speed in any desired manner well known to those skilled in the art.

In the electrodynamometer type instrument mechanism illustrated in Fig. 1, stationary coils 22 and 23 cooperate respectively with movable coils 24 and 25 mounted upon a common shaft 26. The shaft 26 is biased to a zero position by means of a spiral spring 27 fastened at one end to the shaft 26 and at the other end to a lug 28 on the stationary portion of the apparatus (shown only in part). The pen 15 is mounted on an arm 29 carried by the shaft 26. A sufficient number of stationary and movable coils are employed to form a number of single-phase wattmeter units, one less than the number of conductors of the polyphase line to which the apparatus is connected in accordance with the well known method of measuring polyphase power. Thus, in the present case, with a three-conductor system 12—13—14, the coils 22 to 25 are employed to form two units, 22—24 and 23—25, and, of course, for a single-phase two-wire system only one wattmeter unit would be required.

Suitable means are employed for periodically changing the connections of the wattmeter units 22—24 and 23—25 to cause reactive power to be indicated instead of real power. If desired, a rotating drum switch as shown at 17 may be used for this purpose and the change in connection may be made in the circuit of the movable coils 24 and 25. The stationary coils 22 and 23 are permanently connected in series with conductors 12 and 14, respectively, or, if desired, the coils 22 and 23 may be connected through series transformers 30 and 31. In accordance with the normal wattmeter connections, the movable potential coil 24 is connected between conductors 12 and 13 as will be apparent from the description hereinafter of the drum switch 17. Likewise, the movable potential coil 25 is normally connected between conductors 13 and 14.

To obtain reactive power indications, the potential coils are reconnected so as to be acted upon by voltages in quadrature with the voltages acting thereon during the real power connections. This may be accomplished by means of phase shifters or phase splitters, by connecting inductance or capacitance in series with coils 24 and 25 or simply by connecting the coils to different points in a polyphase system. For example, as shown in Fig. 1, a three-phase autotransformer or three reactances 32, 33 and 34 connected in delta to conductors 12, 13 and 14 may be employed. For indicating reactive power, coil 24 is connected between conductor 14 and the midpoint of reactance 33, and coil 25 is connected between conductor 12 and the midpoint of reactance 34, as will become apparent when the operation of drum switch 17 is described hereinafter. Another arrangement which may be used for obtaining quadrature voltage will be described in connection with Fig. 2.

The drum switch 17 consists of a plurality of rotatable ring contacts 35 to 38 cooperating with a plurality of stationary contacts 39 to 50. The ring contacts 35 to 38 are carried by a drum, not shown, rotated at a uniform rate of speed by any suitable device such as, for example, a synchronous motor 51 connected to lines 13 and 14 and having speed-reducing gearing 52. For clarity, the ring contacts 35 to 38 are represented by a development of their cylindrical surface but it will be understood that they are actually portions of a cylindrical surface and that the stationary contacts 39 to 50 actually lie tangent to this cylindrical surface.

As the drum switch 17 rotates, the portions 53 and 54 alternately come past the stationary contacts to produce the effect of two double-pole double-throw switches alternately shifting the connections of coils 24 and 25 and the intervening narrow portions serve to open the connections between shifts. When portions 53 are under the stationary contacts, power measurement connections are made and a circuit is formed from conductor 12 through a conductor 56, contact 39, ring 35, contact 40, conductors 57 and coil 24, contact 43, ring 36, contact 42, and conductor 58, back to conductor 13. In a similar manner, coil 25 is connected between conductors 13 and 14.

Likewise, when portions 54 are under the stationary contacts, reactive power measurement connections are made and a circuit is formed from common terminal 59 of reactances 32 and 34 through conductor 60, conductor 14, conductor 61, contact 44, ring 36, contact 43, conductors 57 and coil 24, contact 40, contact 41, and conductor 62, to the midpoint of reactance 33. In a similar manner coil 25 is connected between common terminal 63 of reactances 32 and 33 and midpoint of reactance 34.

The reactances 32, 33 and 34 have been placed in the drawing in such a manner that their directions represent the vector relations of the voltages therein. It is evident that, as coil 24 is alternately connected across reactor 33 and from the midpoint of reactor 33 to terminal 59, the voltage acting on coil 24 is shifted 90 degrees in phase. Coil 25 is affected in like manner.

The portions 53 of drum switch 17 have been made greater in length than the portions 54 in order that the longer time periods 64 of the curve in chart 16 will represent recorded values of real power, and the shorter time periods 65 will represent recorded values of reactive power. The value of power factor at the end of a stated interval can, of course, be readily deduced from the values of real and reactive power at an instant corresponding to the beginning or end of one of the time periods 64 or 65. To facilitate a clear distinction between the portions of the curve giving the real power and the reactive power, the pen is caused to drop to the zero line at the end of each time period 64 or 65, producing the transverse lines 66, marking the long and short periods 64 and 65 during which real power and reactive power, respectively, are recorded. The operation of switch 17 and the advance of the record sheet may be coordinated or synchronized, and for this purpose both may be driven by synchronous motors connected to the same a-c supply system. As previously explained, the narrow portions 55 of the rings of the drum switch 17 open the connections of the coils 24 and 25 to permit the instrument mechanism to fall back to the zero position.

In applying my invention to single-phase two wire circuits the arrangement of Fig. 2 may be employed. In this case, the single phase instrument 11' is employed in connection with a single phase distribution line having the conductors 12 and 13. An impedor box 69 is provided consisting of a reactance 70 and a resistor 71 connected in series across the lines 12 and 13 and having the common point brought out to a contact 72. A potential coil resistor 73 is also provided which is connected between the conductor 13 and a contact 74. For shifting the instrument connections a double-throw timed relay 75 is provided having a movable contact 76 cooperating with the contacts 72 and 74 and having a suitable mechanism 77 of any desired type well known in the art for intermittently throwing the movable contact 76 back and forth between the stationary contacts 72 and 74.

When the contact 76 is thrown upward the resistor 73 is in series with the instrument potential coil 24 and the instrument records watts. When the movable contact 76 is thrown downward the impedor box 69 is thrown into the circuit and the instrument is caused to record reactive volt amperes. The resistance and reactance values of the box are so adjusted that the coil 24 of the instrument is lagged 90 degrees, thus giving the correct measurement of reactive volt amperes.

Although a single phase watt instrument 11' has been illustrated in Fig. 2 it will be understood that one is not limited to the use of a single-phase instrument in single phase circuits, as a polyphase type of instrument may also be employed either by using a single element thereof or by connecting the current coils in series and the potential coils in multiple. Of course, I may use the polyphase instrument 11 of Fig. 1 together with a set of controlling boxes, such as the impedor box 69, and the phase shifter 32, 33, 34 of Fig. 1 for producing records in single phase, two phase, three phase and quarter phase circuits, as desired.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claim.

What I claim as new and desire to secure by Letters Patent of the United States is:

In a recorder of characteristics of an alternating-current circuit, a pen-operating movement comprising relatively movable current-conducting coils in inductive relation, connections for applying a voltage corresponding to circuit voltage to one of said coils and connections for passing current corresponding to circuit current through the other of said coils, a phase shifter and means for intermittently interposing said phase shifter in one of said connections, whereby a record may be produced on a single record chart of both real power and reactive power conditions in the circuit.

RALPH M. ROWELL.